Dec. 24, 1968  H. D. HARRIS  3,417,487
DRIER
Filed June 12, 1967  2 Sheets-Sheet 1

INVENTOR:
HAROLD D. HARRIS
BY: 
Atty

Dec. 24, 1968  H. D. HARRIS  3,417,487
DRIER

Filed June 12, 1967  2 Sheets-Sheet 2

INVENTOR:
HAROLD D. HARRIS
BY:
*Atty.*

United States Patent Office 3,417,487
Patented Dec. 24, 1968

3,417,487
DRIER
Harold D. Harris, Lubbock, Tex., assignor to Harris and Thrush Manufacturing Company, Lubbock, Tex., a corporation of Texas
Filed June 12, 1967, Ser. No. 645,251
1 Claim. (Cl. 34—233)

ABSTRACT OF THE DISCLOSURE

Hot drying air is forced into a mass of agricultural produce to be dried from the top and bottom. The humid air from the produce is removed by tubes extending through the central part of the mass at right angles to the direction of the flow of the air above and below the mass. Air is directed to the different parts of the mass by dampers on the outlet of the tubes.

BACKGROUND OF THE INVENTION

*Field of the invention*

This invention relates to drying and more particularly to drying agricultural produce such as peanuts or oats.

*Description of the prior art*

Present commercial practice is to harvest peanuts and load them immediately after digging onto trucks to be carried to market. The trucks are taken to a place for drying where the wet produce is loaded upon an open-top wagon or trailer having a false floor. The wagon is moved to a source of warm dry air and the warm dry air connected to the space between the floor and the false floor of the wagon. Thus, the warm dry air moves upward through the produce and is expelled from the open top of the wagon. Often the produce will be dried for 12 to 24 hours in this fashion. Once the produce is dry it is then dumped from the drying wagon and reloaded into a truck to be transported to a place of storage or processing.

The difficulty of the open-top wagon, now primarily in commercial use, is that the warm air introduced into the bottom at the back tends to move along the bottom to the front of the wagon. The main drying effect occurs at the front of the wagon or at least more drying occurs at the front than at the back. Although it is common practice to use baffles to direct the air toward the back and uniformly along the load, these have generally proved unsatisfactory with the results that some parts of the load receive more air than other parts. Often the results is that the bottom of the load becomes extremely dry or parched or roasted before the top of the load has obtained a desirable humidity level.

It has been suggested that the open wagon could be closed and sealed at top and the warm air introduced from the bottom and exhausted from the top and then the flow reversed and the warm dry air introduced at top and exhausted from the bottom.

Although I have described the produce as peanuts, these driers are used for many agricultural products, e.g. it is customary to harvest oats while they still have high humidity to be dried before storage. Furthermore, in haresting many crops for planting seed, it is customary practice to dry the produce immediately upon harvesting.

SUMMARY

According to this invention, a wagon as used before is sealed at the top. The top may be opened for loading the produce and then closed. It is not necessarily air-tight, but there is not a substantial loss of air from the wagon. Also, the tail gate is in the form of a swinging door so that the product can be removed from the wagon. A duct connects the bottom air space between the floor and the false floor to the top of the wagon underneath the sealed top. A series of transverse perforated tubes extend from one side of the wagon to the other. The flow of the air is from the top to the tubes or the bottom to the tubes. The flow of air through the produce is approximately one-half the distance of what it is according to the present commercial practice. Furthermore, if one portion of the produce in the wagon dries first, shutters or dampers on the outlet of the tube may be closed to adjust the flow of the air so that the produce is uniformly dried without over drying or over heating other portions of the load.

An object of this invention is to dry agricultural produce.

Other objects are to achieve the above with a device that is sturdy, compact, durable, simple, safe, versatile, and reliable, yet inexpensive and easy to manufacture, operate and maintain.

Further objects are to achieve the above with a method that is rapid and inexpensive and does not require skilled people to adjust, operate and maintain.

The specific nature of the invention, as well as other objects, uses, and advantages thereof, will clearly appear from the following description and from the accompanying drawing, the different views of which are not to the same scale.

DESCRIPTION OF THE PREFERRED EMBODIMENT

Figure 1:
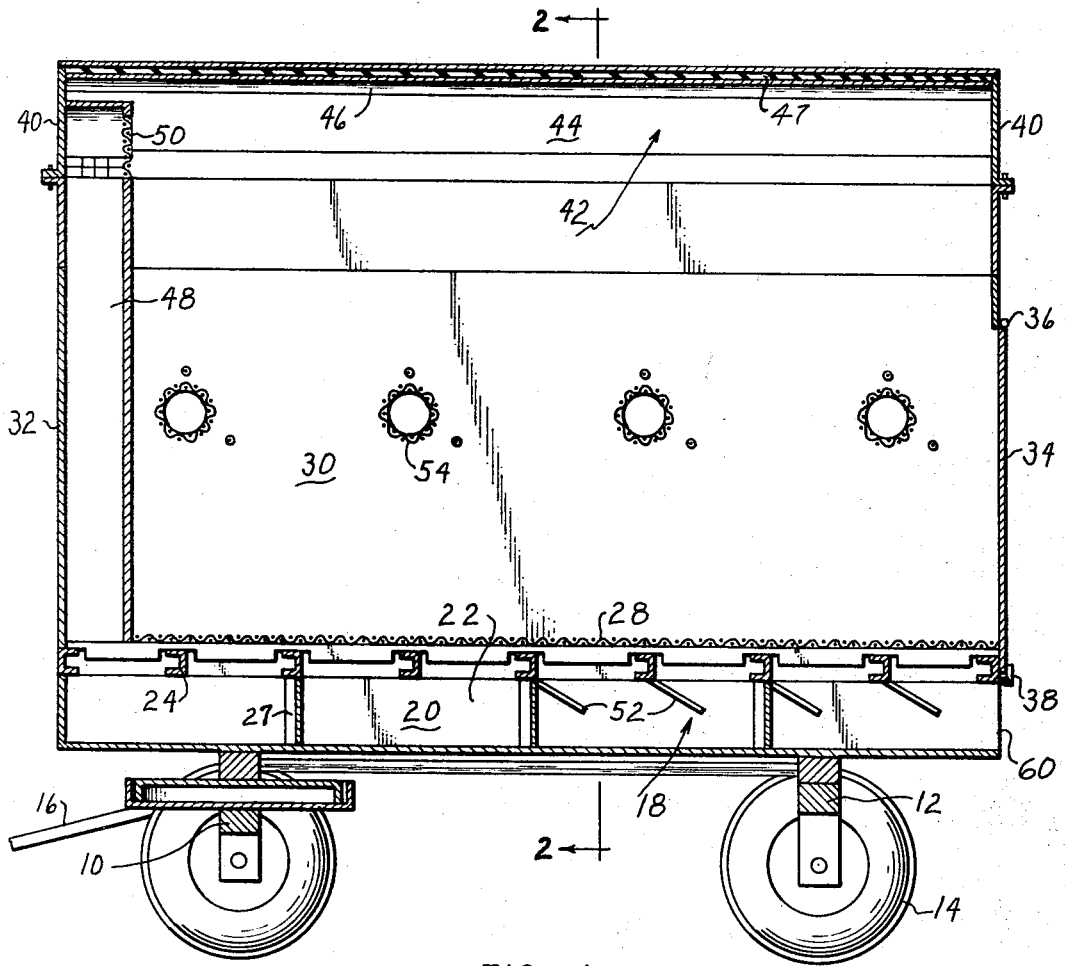
FIG. 1 is longitudinal sectional view of a wagon according to this invention, taken substantially on line 1—1 of FIG. 2.
Figure 3:
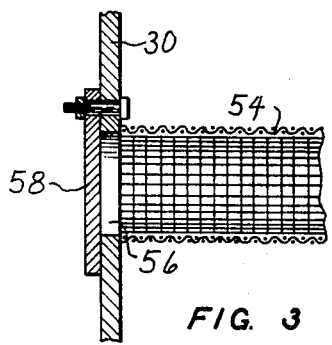
FIG. 3 is a detailed sectional view of the outlet of one of the tubes.
Figure 2:
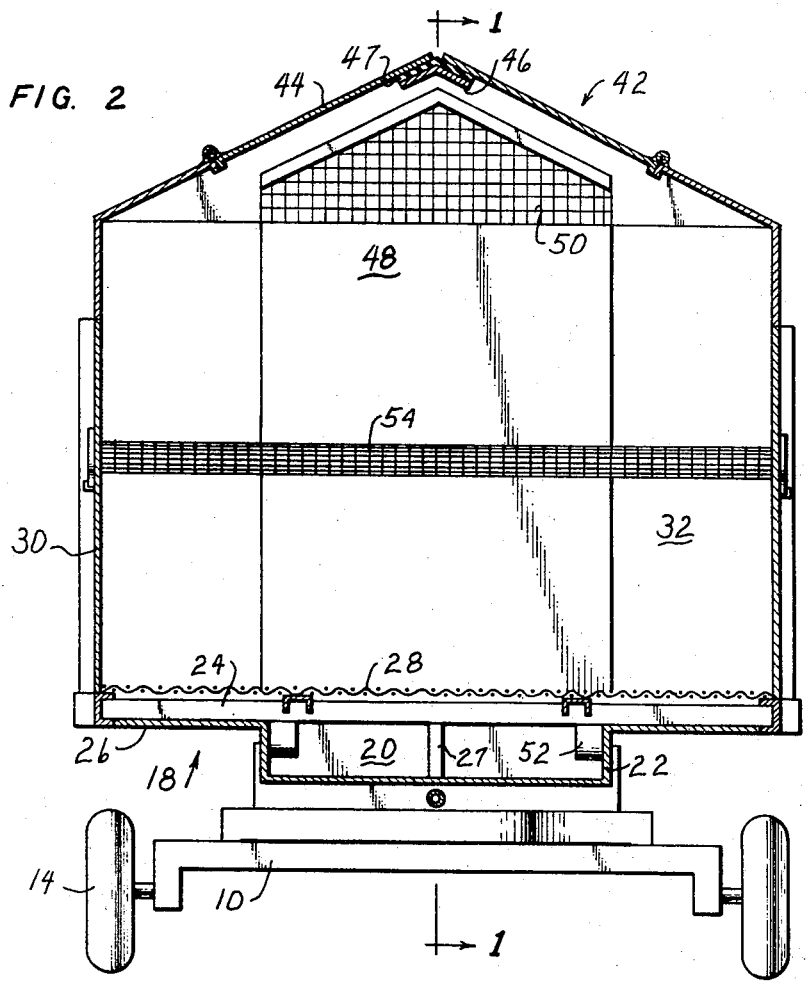
FIG. 2 is a cross sectional view thereof, taken substantially on line 2—2 FIG. 1.
Figure 4:
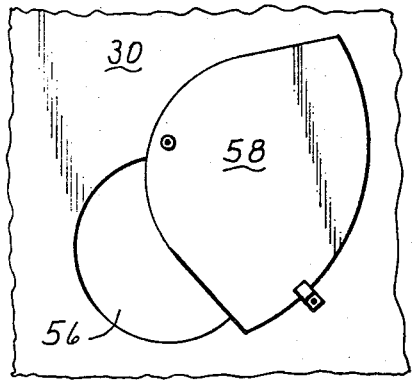
FIG. 4 is a detailed side elevational view of the outlet of one of the tubes and damper therefor.

Referring more particularly to the drawing, a trailer or wagon having running gear is seen. The running gear includes front axle 10, rear axle 12 and ground engaging wheels 14. Tongue 16 attached to front axle provides means for towing and guiding the wagon to the desired position.

The floor 18 of the wagon is made of heavy sheet metal. The center of the floor is lower, forming conduit 20 and two vertical members 22 which form longitudinal support or runners for the wagon box.

Transverse channels 24 are mounted above the side floor elements 26. These channels operate as crossbeams. Short posts 27 support the channels 24 from the bottom of the conduit 20. False floor 28 is mounted on top of the channels 24. Agricultural produce is loaded into the wagon box above the false floor. The false floor 28 is preferably formed of perforated sheet metal, although in the drawing it has been illustrated as a woven wire screen for purposes of clarity. It will be understood that it could be made of any material including expanded metal lathe, provided the openings of the floor are small enough so that the product loaded therein does not fall through and, further, provided that there is sufficient opening for the circulation of air.

The box or bed or the container portion of the wagon is completed with two sides 30 and front end 32 and rear end or end gate 34. As illustrated, the end gate is pivoted by a rod at the top 36 and is latched by mechanism 38 at the bottom, so that the end gate may be swung open to unload the produce within the box.

Gables 40 on the front and back form a support for top top or roof 42. The top is formed with a door 44 on each side which is pivoted to the edges of the top and is normally kept closed by gravity. The two doors meet and are supported along longitudinal beam 46 in the center. Rubber strips 47 along the joints make the closure substantially airtight so that most of the air within the container is not lost.

Conduit or air duct 48 extends at the front of the wagon from the false floor up to the top of the wagon box just below the top 42. The duct 48 has approximately the same cross sectional area as does the conduit 20 in the bottom of the box. The duct 48 is open at the top and is conveniently covered with screen 50 made of perforated metal to prevent agricultural produce from falling in it.

Baffles 52 in the conduit 20 tend to distribute air uniformly along the bottom of the box.

Four tubes 54 extend from one side 30 to the opposite side. They are evenly spaced from the false floor 28 to top of the sides 30 which will be the approximate limit of the agricultural produce loaded into the box for drying. They are also evenly spaced from front to back. Thus, the tubes 54 extend transversely of the wagon box through the central part or central area of the box. Each of the tubes 54 is made of the perforated metal so that air can readily enter the tubes. The tubes are open at 56 through the sides 30. Damper 58 is over each of the openings and to the outside of each opening 56 of each of the tubes 54. Thus, the amount of air flowing through each of the tubes may be limited.

OPERATION

In operation, the doors 44 and in the top 42 are open and the box loaded with wet or damp agricultural produce to approximately the top of the sides 30 which would be the bottom of the gables 40. Then the wagon is moved to a source of warm air and the source of warm air connected to opening 60 which is the opening of conduit 20 at the rear of the wagon. Then the warm air is circulated in through the opening 60 and through conduit 20 below the false floor 28. The warm air moves upward through the produce. Also, the warm air moves upward through the air duct 48 to the space above the agricultural produce and below the top 42, the doors 44 now being closed. The only escape for the air above the produce is through the agricultural produce. The warm air moves to the plurality of tubes 54.

After the produce has approximately sufficient time to be dried, the doors 44 are opened and samples of the produce taken by probe as is well known and in common practice in the art today. If certain portions of the produce have reached a sufficient state of dryness, then the dampers 58 connected to the tubes 54 where produce is sufficiently dry are closed and the drying operation continued until all portions of the load are dried. At that time the wagon is disconnected from the source of warm, dry air and moved to a place of unloading at which time the end gate 34 is opened and the produce moved from the box by tilting the entire wagon.

Thus, it may be seen that I have provided a simple, sturdy structure to quickly and efficiently dry agricultural produce. Details of construction well known in the art have not been shown or described; e.g. the reach pole and stakes of the wagon are shown but not described.

It will be understood that many modifications can be made; e.g. instead of using a plurality of small tubes extending transversely of the box, one large tube could be used which would run through the central part of the box but extending longitudinal rather than transversely.

It will be apparent that the embodiment shown is only exemplary and that various modifications can be made in construction, materials, and arrangement within the scope of the invention as defined in the appended claims.

I claim as my invention:

1. A drier for agricultural produce comprising a box with two sides, two ends and a floor, an undercarriage including a rear axle with wheels and a front axle for towing and guiding the drier to the desired position, a perforated false floor in the drier, a conduit formed between the false floor and the floor, said conduit opening at the rear of the box adjacent to said rear axle, a duct at the front of the box connected to the conduit so that hot air may be induced through the opening in the conduit and a portion of the air passed through the duct, at least one perforated tube mounted in the box about midway between top and bottom of the box, and an end gate in the rear of the box, said end gate forming a portion of the rear end of the box, said end gate pivoted by a rod at the top of the end gate to the remainder of the rear end of the box and the bottom of the end gate latched, so that the end gate may be swung open to unload the produce within the box.

References Cited

UNITED STATES PATENTS

| | | | |
|---|---|---|---|
| 83,753 | 11/1868 | Alden | 98—55 |
| 2,532,530 | 12/1950 | Andersen et al. | 34—233 |
| 2,737,878 | 3/1956 | Maho | 98—56 XR |

KENNETH W. SPRAGUE, *Primary Examiner.*

U.S. Cl. X.R.

98—55